US011176277B2

(12) United States Patent
Cuomo et al.

(10) Patent No.: US 11,176,277 B2
(45) Date of Patent: Nov. 16, 2021

(54) AUTOMATIC GENERATING ANALYTICS FROM BLOCKCHAIN DATA

(71) Applicant: International Business Machines Corporation, Armonk, NY (US)

(72) Inventors: Gennaro A. Cuomo, Durham, NC (US); Donna N. Dillenberger, Yorktown Heights, NY (US); Fenno F. Heath, III, Woodbridge, CT (US); Rong Liu, Sterling, VA (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/680,481

(22) Filed: Nov. 11, 2019

(65) Prior Publication Data

US 2020/0082127 A1    Mar. 12, 2020

Related U.S. Application Data

(63) Continuation of application No. 15/462,873, filed on Mar. 19, 2017, now Pat. No. 10,515,233.

(51) Int. Cl.
*G06F 21/64* (2013.01)
*H04L 9/32* (2006.01)
*G06F 16/248* (2019.01)

(52) U.S. Cl.
CPC .......... *G06F 21/645* (2013.01); *G06F 16/248* (2019.01); *H04L 9/3236* (2013.01); *H04L 9/3297* (2013.01); *H04L 2209/38* (2013.01)

(58) Field of Classification Search
CPC ................ G06F 21/645; G06F 16/248; G06F 17/30185; G06F 17/30327;
(Continued)

(56) References Cited

U.S. PATENT DOCUMENTS

| 9,384,244 B1 | 7/2016 | Garg et al. |
| 10,095,888 B1 | 10/2018 | Lee et al. |

(Continued)

FOREIGN PATENT DOCUMENTS

| CN | 105718516 A | 6/2016 |
| CN | 105976231 A | 9/2016 |

(Continued)

OTHER PUBLICATIONS

List of IBM Patents or Patent Applications Treated as Related, Dec. 17, 2019.

(Continued)

*Primary Examiner* — Abu S Sholeman

(57) ABSTRACT

A blockchain of transactions may be referenced for various purposes and may be later accessed by interested parties for ledger verification and information retrieval. One example method of operation may include identifying a number of data parameters to extract from a blockchain based on a request for analytic data, creating one or more queries based on the data parameters, executing the one or more queries and retrieving the data parameters from the blockchain, identifying one or more permissions of a user account associated with the request for analytic data, and populating an interface with analytic figures based on the data parameters retrieved from the blockchain.

20 Claims, 5 Drawing Sheets

(58) Field of Classification Search
CPC ............. G06F 17/30097; H04L 9/3236; H04L 9/3297; H04L 2209/38; H04L 2209/56; H04L 9/0825; H04L 9/3231; H04L 9/3565; H04L 9/0643; H04L 9/0861; H04L 9/0637; G06Q 20/40145; G06Q 30/06

See application file for complete search history.

(56) References Cited

U.S. PATENT DOCUMENTS

| | | | |
|---|---|---|---|
| 10,158,479 | B2 | 12/2018 | Chapman et al. |
| 10,298,395 | B1 | 5/2019 | Schiatti et al. |
| 10,885,022 | B1 | 1/2021 | Tian |
| 2004/0083395 | A1* | 4/2004 | Blechman .............. G16H 40/20 726/28 |
| 2008/0065436 | A1 | 3/2008 | Wu et al. |
| 2011/0093324 | A1 | 4/2011 | Fordyce, III et al. |
| 2012/0030027 | A1 | 2/2012 | Nomula |
| 2014/0337328 | A1 | 11/2014 | Sarvabhotla et al. |
| 2015/0134694 | A1 | 5/2015 | Burke et al. |
| 2016/0267474 | A1 | 9/2016 | Lingham et al. |
| 2016/0342978 | A1 | 11/2016 | Davis et al. |
| 2017/0011392 | A9 | 1/2017 | Lingham et al. |
| 2017/0046792 | A1 | 2/2017 | Haldenby et al. |
| 2017/0053295 | A1 | 2/2017 | Tiell et al. |
| 2017/0093923 | A1 | 3/2017 | Duan |
| 2017/0243193 | A1 | 8/2017 | Manian et al. |
| 2017/0286880 | A1 | 10/2017 | Wiig et al. |
| 2017/0344988 | A1 | 11/2017 | Cusden et al. |
| 2018/0040073 | A1* | 2/2018 | Ghosh .................. G06Q 20/401 |
| 2018/0068130 | A1 | 3/2018 | Chan et al. |
| 2018/0102952 | A1 | 4/2018 | Gopalakrishnan et al. |
| 2018/0129958 | A1* | 5/2018 | Saxena .............. G06Q 20/3825 |
| 2018/0137465 | A1 | 5/2018 | Batra et al. |
| 2018/0181768 | A1 | 6/2018 | Leporini et al. |
| 2018/0189753 | A1 | 7/2018 | Konda et al. |
| 2018/0225640 | A1 | 8/2018 | Chapman et al. |
| 2018/0225660 | A1 | 8/2018 | Chapman et al. |
| 2018/0227116 | A1 | 8/2018 | Chapman et al. |
| 2018/0294977 | A1* | 10/2018 | Uhr ........................... H04L 9/32 |
| 2018/0343306 | A1 | 11/2018 | Lotter et al. |
| 2020/0027067 | A1* | 1/2020 | Hertzog ................. G06Q 20/10 |
| 2020/0167764 | A1* | 5/2020 | Lin ....................... H04L 63/123 |

FOREIGN PATENT DOCUMENTS

| | | |
|---|---|---|
| CN | 106296382 A | 1/2017 |
| CN | 106326437 A | 1/2017 |
| CN | 106330431 A | 1/2017 |
| CN | 106357612 A | 1/2017 |
| CN | 106372240 A | 2/2017 |
| CN | 106445993 A | 2/2017 |
| CN | 106453407 A | 2/2017 |
| CN | 106506203 A | 3/2017 |
| GB | 2540975 A | 2/2017 |
| JP | 2008065828 A | 3/2008 |
| JP | 2014215912 A | 11/2014 |
| WO | 2015175722 A1 | 11/2015 |
| WO | 2017006135 A1 | 1/2017 |

OTHER PUBLICATIONS

Gennaro A. Cuomo et al., "Automatic Generating Analytics From Blockchain Data", U.S. Appl. No. 15/462,873, filed Mar. 19, 2017 (a copy is not provided as this application is available to the Examiner).
Notice of Reasons for Refusal issued in the Corresponding JP Application No. 2019-549401, drafted on Dec. 24, 2020.
International Search Report and the Written Opinion, PCT/IB2017/057678, dated Dec. 6, 2017.
International Search Report and Written Opinion, PCT/IB2017/057602, dated Mar. 19, 2018.
International Search Report and Written Opinion, PCT/IB2017/057676, dated Apr. 28, 2018.
Anonymous, Customer interview 3 Mitsubishi UFJ Financial Group, Inc. for changing the financial services by co-creation strategy of FinTech, Provision 2017, Feb. 23, 2017, No. 91, pp. 18-23, IBM Japan, Ltd., Japan.
Decision to Grant a Patent issued in the corresponding JP Application No. 2019-549401, dated Apr. 30, 2021.

* cited by examiner

300

AUTOMATIC GENERATING ANALYTICS FROM BLOCKCHAIN DATA

TECHNICAL FIELD

This application relates to auditing and mining data in the blockchain, and more particularly, to identifying specific information and generating analytics according to customized requirements.

BACKGROUND

The blockchain may be used as a public ledger to store any type of information. Although, primarily used for financial transactions, the blockchain can store any type of information including assets (i.e., products, packages, services, status, etc.). The blockchain may be used to securely store any type of information in its immutable ledger. Decentralized consensus is different from the traditional centralized consensus, such as when one central database used to rule transaction validity. A decentralized scheme transfers authority and trusts to a decentralized network and enables its nodes to continuously and sequentially record their transactions on a public "block," creating a unique "chain" referred to as the blockchain. Cryptography, via hash codes, is used to secure the authentication of the transaction source and removes the need for a central intermediary.

Since blockchain is a permissioned distributed data system, designed with strict privacy and security control, it is not easy to create analytics which provides insight for multiple parties. For example, questions raised by interested parties, such as, for example, how a party's business transactions and behaviors are as compared with other parties, may be answered by examining data in the blockchain and determining outliner/abnormal patterns of a party compared with other parties.

Most conventional configurations are designed to assume that data is relatively centralized with either full or less restrictive permissions. Analytics can be calculated from the data without any constraints. Most analytic approaches focus on data driven concerns, and blockchain combines data with certain characteristics, smart contracts, participants and other features.

SUMMARY

One example method of operation may include identifying a plurality of data parameters to extract from a blockchain based on a request for analytic data, creating one or more queries based on the data parameters, executing the one or more queries and retrieving the data parameters from the blockchain, identifying one or more permissions of a user account associated with the request for analytic data, and populating an interface with analytic figures based on the data parameters retrieved from the blockchain.

Another example embodiment may include an apparatus that provides a processor configured to identify a plurality of data parameters to extract from a blockchain based on a request for analytic data, create one or more queries based on the data parameters, execute the one or more queries and retrieving the data parameters from the blockchain, identify one or more permissions of a user account associated with the request for analytic data, and a transmitter configured to transmit analytic figures to populate an interface based on the data parameters retrieved from the blockchain.

Yet another example embodiment may include a non-transitory computer readable storage medium configured to store instructions that when executed causes a processor to perform identifying a plurality of data parameters to extract from a blockchain based on a request for analytic data, creating one or more queries based on the data parameters, executing the one or more queries and retrieving the data parameters from the blockchain, identifying one or more permissions of a user account associated with the request for analytic data, and populating an interface with analytic figures based on the data parameters retrieved from the blockchain.

DETAILED DESCRIPTION

Figure 1A:
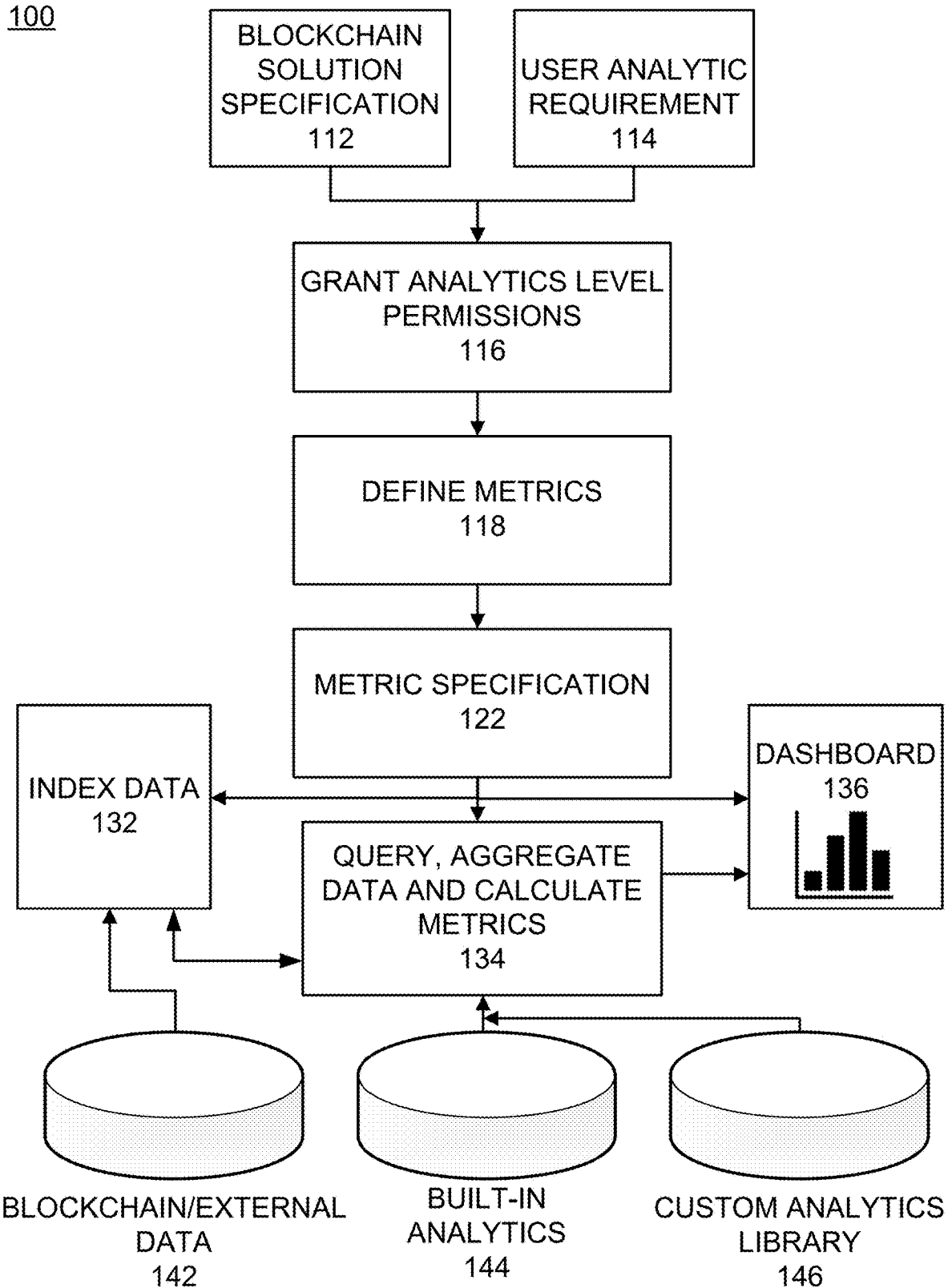
FIG. 1A illustrates a logic diagram of a blockchain analytic data model, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a blockchain and a corresponding blockchain network of peer devices or registered accounts which may be part of a private "consortium". The enrolled/registered members of the blockchain consortium can provide/share/change/upload/download analytics to all enrolled members of the consortium in various ways. For example, predefined built-in analytics, such as aggregated metrics may be shared to all members without disclosing information regarding specific parties. For instance, an average price from all available parties may be obtained for a particular commodity or well-known and common product or service. Such information could be readily available to government agencies for integrity mapping. For example, the Federal Trade Commission (FTC) may be concerned with unfair business practices or price-fixing of products for antitrust concerns. The dates, times, quantities, etc., of a product sold can quickly be ascertained and mapped to identify anomalies leading to suspected candidates in such a configuration. Custom analytics across various parties to the blockchain can be obtained through explicit permission control constructs, such as comparing one's own product price to those of others to arrive at a graph or visualization of all such relevant data.

In this configuration, the blockchain and the network of blockchain members or peers may be part of an assigned "consortium" or membership group that embodies all such members as privileged parties which can access their data and the data of others, according to their privilege status. Such a configuration can provide analytics across parties with explicit permission control. A user's analytic requirements may contain metrics from various types of data requirements. Once retrieved, the analytics may be created and displayed in a dashboard, which may also be customized according to predetermined criteria, user account profile preferences or other preferences which are referenced and utilized to display such dashboard data.

Example embodiments may also provide a trusted ledger, such as a blockchain, that has internalized or custom configuration type built-in analytics with explicit "analytics level" permission control (e.g., privacy preserving access). Analytics regarding particular aggregated behaviors can be used for analytic purposes and shared with enrolled parties to the blockchain. Analytics can be designed as a type of "transaction" and parties can request with permission control. In general, the blockchain may provide a pool of timestamped data, current and historical state data and ledger data, cross-partner/cross-organizational data, a log of processes, strong identities, and the data is already agreed upon and trusted data that does not require verification. The analytic data approach, according to example embodiments, provides an automated mechanism for generating solution-specific analytical solutions that leverage the blockchain specification and produce end-to-end customizable analytics.

FIG. 1A illustrates a logic diagram of a blockchain analytic data model according to example embodiments. Referring to FIG. 1A, the configuration 100 includes a process by which a blockchain solution specification 112 is combined with a user analytic requirement 114 to produce analytic data. In this approach, the request for analytic data may require a permission confirmation to grant analytic permissions 116 prior to mining data and producing intelligible results. The metrics are then defined 118 and a metric specification is created 122 which is used to process retrieved data by topic, category, parameter, etc. The query and aggregate data and other metrics 134 are then produced based on index data 132 and the various data sources 142-146. The blockchain data or external data 142 is a databank of available data for the querying operations. The built-in analytics 144 and custom analytic libraries 146 may be stored in a blockchain system configuration and retrieved and processed for each data request received. The result includes notifications, display data/visualization data and other analytic data which may be forwarded to a user dashboard 136.

In FIG. 1A, the system configuration is integrated with a blockchain runtime and includes auto-created data connectors, querying and data retrieval mechanisms, auto-generated analytical modules, and auto-generated customizable dashboards. The privileged access grant may provide restricted access for purposes of creating particular analytics, which may be desired in accordance with privacy concerns/preferences of the participating parties. In one example, a blockchain participant may be willing to offer data for only aggregate level time series analytics (e.g., aggregated by hour, type of product, etc.), for a specified timeframe (e.g., last 24 hours, 7 days, 30 days, etc.), and not willing to disclose any individual transaction level information other than the aggregations of data. The transaction data may be parsed per the security requirements so raw data is extracted from the transactions and administrative and business related data may be omitted to avoid security violations. A participant in the blockchain consortium may not be willing to provide their data for any clustering and predictive modeling purposes. The user may restrict access to their data based on the consortium rules and their own user account preferences.

User analytics requirements are defined as metrics based on a blockchain specification, including an asset data structure, smart contracts/transaction types, parties, and a security model which fully observes analytics level permissions. Attributes needed for metrics calculation are indexed in the blockchain/external data sources 142. The indexed data 132 may be data which all participants have agreed to provide for particular types of analytics desired by other members and certified third parties. Parameterized queries of the indexed data are created to compute metrics for display purposes. Certain built-in functions for commonly used blockchain analytics may include count transactions, sum asset values, time series analysis of transaction(s), anomaly detection of transactions, etc.

Figure 1B:
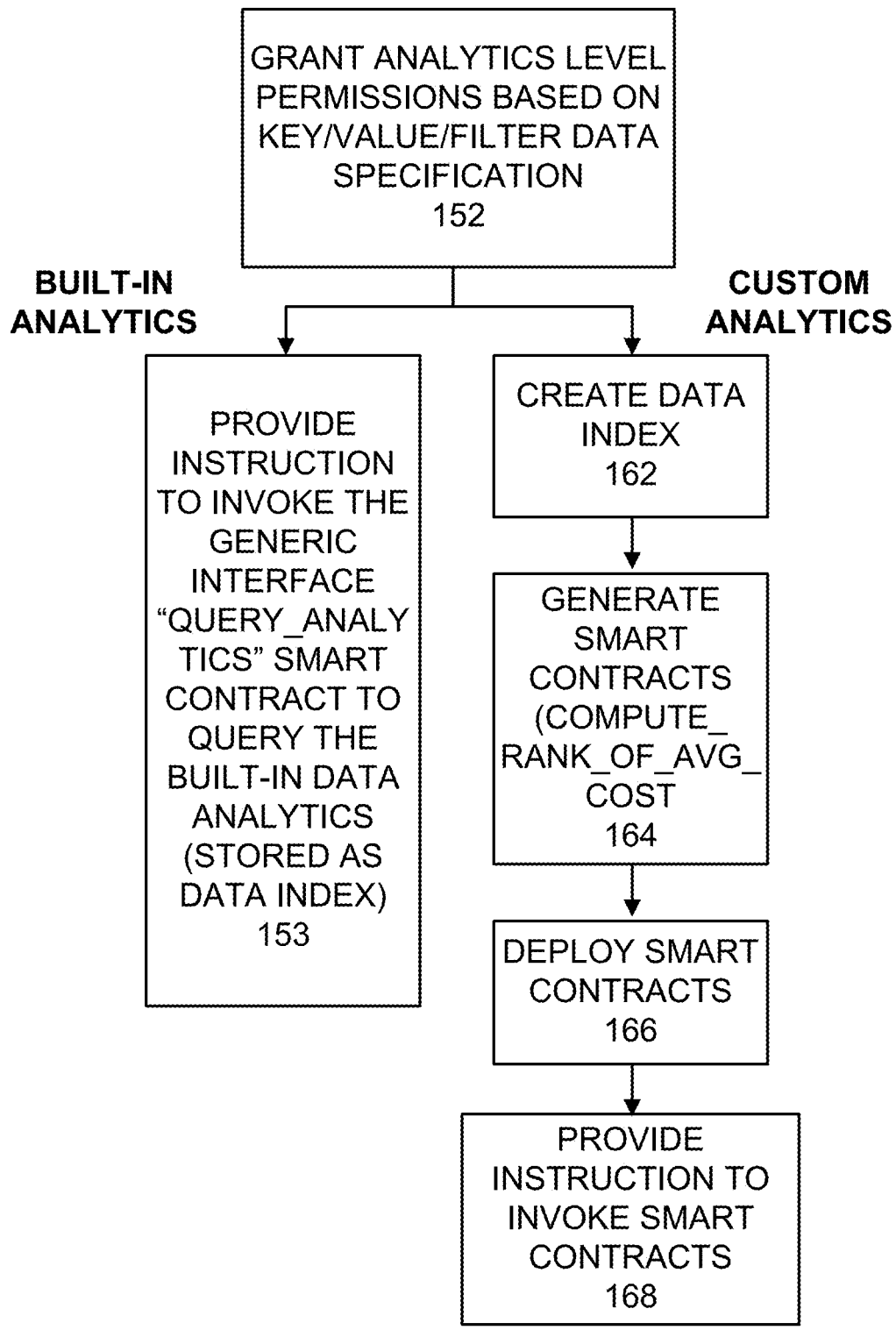
FIG. 1B illustrates a logic diagram of a built-in analytic model or a custom analytic model for a blockchain analytic data model, according to example embodiments.

FIG. 1B illustrates a logic diagram of a built-in analytic model or a custom analytic model for a blockchain analytic data model, according to example embodiments. Referring to FIG. 1B, the configuration 150 includes two scenarios the granting of analytics level permissions 152 may provide the built-in analytic scenario which includes a simple instruction being used to invoke a generic interface "query_analytics" via a smart contract to query the built-in data analytics, which are stored as the data index 153. Additionally, when the data index needs to be created 162, the smart contracts are generated to include the specific calculation "compute_rank_of_avg_cost" 164, the smart contract 166 can then be deployed and instructions may be generated to invoke the smart contracts 168.

The index data is pre-registered data or cached data used for specific metrics, however, with strict permission control. In operation, it is time-consuming to scan all transactions or ledger data to calculate metrics in real-time. The blockchain can "index" attributes based on analytic requirements. For example, if the blockchain is used to provide "average freight cost per shipment to each country" as one of built-in analytics to its enrolled parties, the analytic engine can extract "freight cost", "shipment ID", "shipToCountry", and timestamp attributes from each shipment transaction when committed, and store that data as a data tuple, <freightcost, shipment_id, country, datatime> to a database table. When a party requests that metric with query parameters (e.g., time window, countries etc.), the analytics engine converts this request into a query to this table. If the permission construct is "built-in analytics", a query is provided with appropriate parameters to retrieve the metrics. This metric can be calculated periodically and stored in the blockchain for an enrolled party to query. A party can invoke the general "query_analytics" smart contract with the provided parameters to retrieve the analytics. If the permission construct is "custom analytics", the analytic engine will first index the data based on a Key/Value/Filter data specification if no matching data index is found. A smart contract is generated based on the data index, metric calculation specification. The smart contract is deployed, and the instruction to invoke the smart contract is provided based on the query specification. For example, is the query involves a specific party and other parties. A smart contract can be generated to ensure this metric can be generated for the right identity.

The "built-in" analytic and program code or functions/libraries (e.g., reduce_avg) for calculating the metrics may be created and installed. There are different options to store the metrics. For example, the analytics engine component can be considered as a "virtual" party in blockchain which stores all indexed data and functions. Or such data can be stored on individual parties. A smart contract is a program that implements some logic for the parties. Smart contracts are interfaces/APIs for parties to access data in a blockchain. A blockchain has its own procedure to execute a smart contract. For analytics, the smart contracts can be accessed to access blockchain data and perform computations. To perform the analytics, a party only needs to invoke them with appropriate parameters as instructed.

A configurable dashboard may be used to display metrics in various styles including but not limited to a pie, line, map etc. A blockchain configuration may contain the following data elements, smart contracts, transaction types, an asset data model, parties with strong identities and a security/permission model, time stamped data regarding records and processes. The analytics can be defined based on a specification, such as a time series/trending analysis for data with a timestamp (e.g., transactions, asset updates, etc.). One example may seek to identify an asset/transaction pattern, anomalies, patterns regarding how assets are used/updated through transactions, including intervals, frequencies, parties, etc. Also, other analytic considerations include anomalies as compared to established patterns, common behaviors across parties or individual behaviors compared with other parties including a rank of a party by some asset value (i.e., cheapest product), transaction volume, etc.

Built-in metrics which do not disclose information regarding specific parties, the blockchain network configuration can compute and store those metrics in a database. Permissioned parties can query the metrics through query transactions. For metrics involving specific parties, smart contracts are created and then an approval is obtained from all parties. Smart contract creation and access to blockchain data approval can be generated using blockchain application creation tools, for example, a fabric composer. Data with timestamps can permit a time series analysis, such as a seasonality pattern, anomaly detection, forecast, etc. Also, since all history data (i.e. "ledger") cannot be changed once committed to the blockchain, analytics computed from such data is authoritative and can be trusted. For example, a user set of objectives may be a set of metrics being identified. As shown in the excel table, each metric is further decomposed into attributes needed. If a metric can be provisioned from built-in analytics, the data attributes are retrieved by a blockchain component (e.g., analytics engine). If the metric can only be obtained through a smart contract, then it follows the smart contract invocation procedure to obtain the data. A query may be an API or a program that is instructed to perform some calculation. For example, if a party queries for an average freight cost per a given region, it can issue a query with parameters such as the following:

```
{
    dataindex: "shipment_freightcost_region" (attributes needed
for this metric have been indexed, or collected),
        startdate:  [2017, 2, 1],
        endend:     [2017, 3, 1]
        reduce_fun: reduce_avg
}.
```

In this example, when the API receives the above-noted query statement, it retrieves data from the 'dataindex', applies a date range filter, and then applies the 'reduce_fun' function, which can be predefined or user-defined. The dates, the variables and other parameters are defined to identify an average off all the available freight cost information. The analytics generated may place a numerical indicator on a graph next to an industry standard so the amount of deviation can be readily identified and shared with interested parties. One approach would be to auto-complete a notification. For example, if a vice president of operations is interested in knowing when any costs of the company exceed the industry standard by more than 10 percent, the analytics could be generated and compared to the threshold percentage (0.10) and if the threshold is exceeded (more than 0.10), then a notification may be sent to alert all interested parties so the numbers can be reduced by manual modifications to the supply chain based on automated data.

An example metric configuration may be defined as the average freight cost per shipment to each country in a 30-day period. Another concern may be the rank of the business as part of the average freight cost per shipment among all carriers within the same geography in a 30 day period. Each metric may be defined as a {key, value} pair, where the key and value may be a composite with a map metric (key, value) pair to attributes, and which may define a key/value/filter data specification. The key/value/filter specifies how data is going to be retrieved from the blockchain data. Also, a determination may be made to determine the permission construct, such as a built-in analytics model and/or a smart contract to the blockchain. In the example where the permission construct is a "built-in analytics", a query is provided with appropriate parameters to retrieve the metrics. For example, query (Q1) will not disclose any specific party information (i.e., no business names). This metric can be calculated periodically and stored in the blockchain for the enrolled party to query. A party can invoke the general "query" smart contract with the provided parameters to retrieve the analytics. The metric calculation function may be 'reduce_avg' for each key, count the first component in the value, sum the 2nd component in the value, and then divide the sum by the count to reach the average.

If a permission construct is a "smart contract", a smart contract is generated based on the key/value/filter data specification, metric calculation specification, and query specification. Also, the necessary permissions need to be granted to deploy/execute the smart contract. For example, query (Q2) may involve a specific party and other parties. A smart contract can be generated to ensure this metric can be generated for the proper identity by ensuring the validated party has such access and those parties without validation do not have that authority.

An example smart contract may include a query to built-in analytics. An example may be:

```
public String query(ChaincodeStub stub, String function, String[ ] args) {
    Psudo code:
String[ ] array specify parameters needed to retrieve the built-in analytics,
e.g.
    {
        dataindex: "shipment_freightcost_region" (attributes
needed for this metrics have been indexed),
            startdate: [2017, 2, 1],
            endend: [2017, 3, 1]
            reduce_fun: reduce_avg
    }
    User permission is verified. After verification, the built-in
metrics within specific date range are returned              }.
```

For a custom analytics approach, an example may be:

```
    public String compute_metrics (ChaincodeStub stub, String
function, String[ ] args) {
        Pseudo code:
        String[ ] array specify metric specification parameters, e.g.
key/value/filters
        Obtain approval to access key/value/filter attributes data
        Calculate metrics based on the logic defined in metric
specification
        Return metrics
        }.
```

Figure 2:
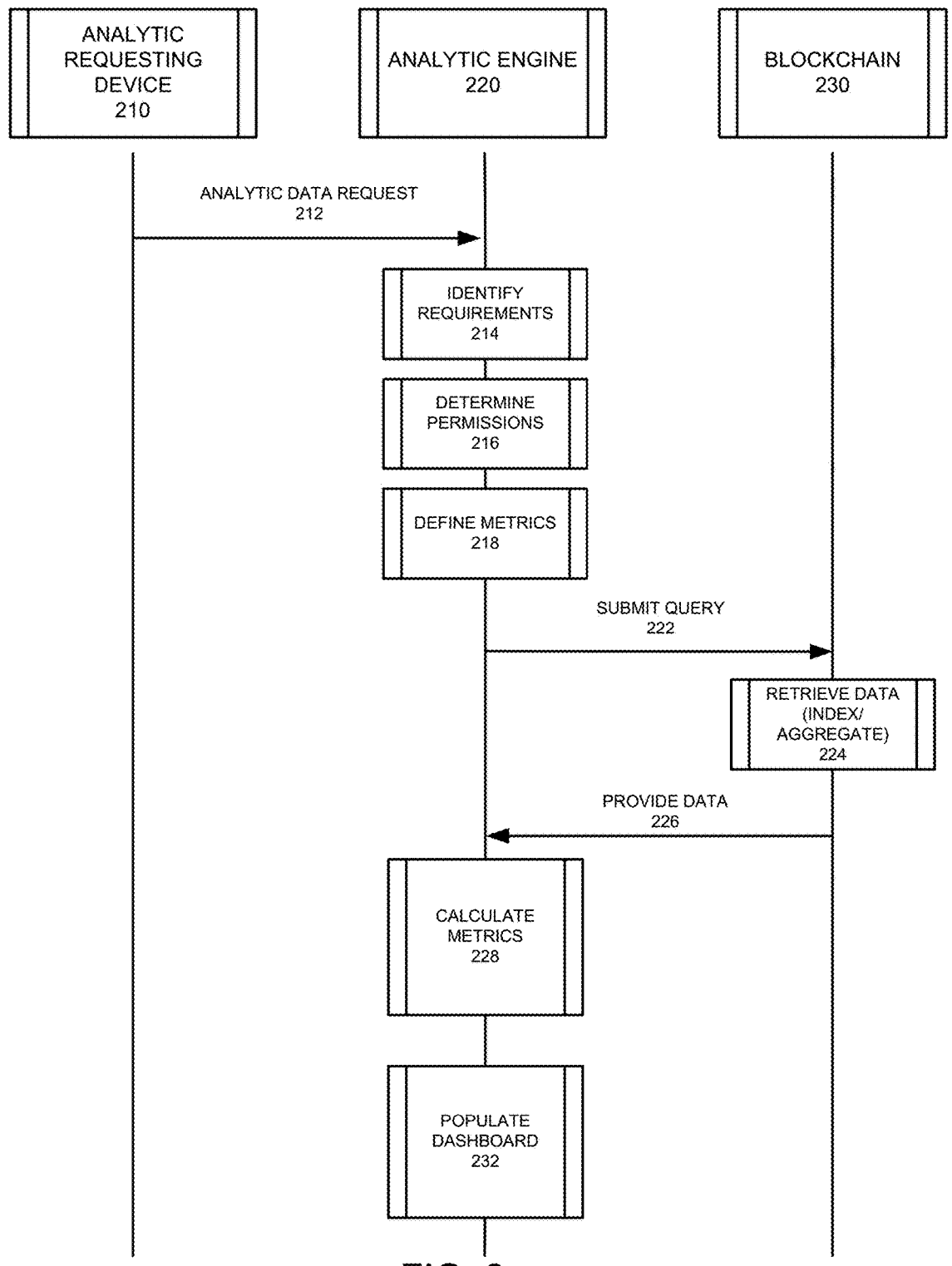
FIG. 2 illustrates a system signaling diagram of the interactions between a user device and a blockchain analytic configuration, according to example embodiments.

FIG. 2 illustrates a system signaling diagram of the interactions between a user device and a blockchain analytic configuration according to example embodiments. Referring to FIG. 2, the system configuration 200 includes an analytic requesting device 210, such as a user device or other computing device. The system may also include an analytic engine 220 which is a software and/or hardware module which executes the analytic realization based on data retrieved from the blockchain data sources 230. In operation, a data request 212 may be initiated automatically or per a specific user request. The analytic engine 220 may receive the request and identify the requirements 214 of the request, the needed permissions and privileges available 216 and then define the metrics 218 as a series of commands, functions or sub-programs which are used to manage the data processing and provide realizable data. The query can then be formulated and submitted 222 to the blockchain management entities which then retrieve the needed data (i.e., index data, aggregate data, etc.) 224 and forward 226 such data to the engine 220 for processing. The metrics 228 can then be calculated by inserting the data into the metric processor module and the dashboard can then be populated 232 with the realizable data to provide a summary, graphs, averages, etc.

Figure 3:
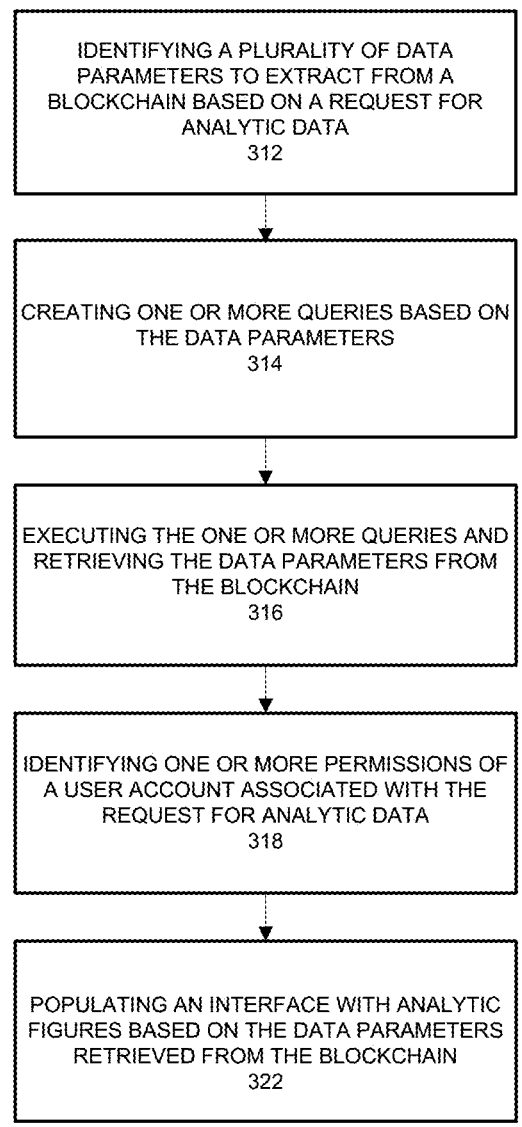
FIG. 3 illustrates a flow diagram of an example method of managing transaction ordering in the blockchain, according to example embodiments.

FIG. 3 illustrates a flow diagram 300 of an example method of managing transaction ordering in the blockchain according to example embodiments. Referring to FIG. 3, the method may include identifying a plurality of data parameters to extract from a blockchain based on a request for analytic data 312, creating one or more queries based on the data parameters 314, executing the one or more queries and retrieving the data parameters from the blockchain 316, identifying one or more permissions of a user account associated with the request for analytic data 318, and populating an interface with analytic figures based on the data parameters retrieved from the blockchain 322. The data parameters may include restricted access privileges which are provided to blockchain consortium members to access the data parameters. The restricted access privileges limit portions of the data parameters which may be retrieved and included in the analytic figures. The method may also include identifying analytic requirements used to identify which of the data parameters to extract from the blockchain. The analytic requirements are based on one or more of smart contracts used in the blockchain, transaction types in the blockchain, parties to transactions in the blockchain and a security function used by the blockchain. The method may also include accessing an existing blockchain analytic library, and determining one or more of a number of transactions, a sum of asset values, a time series analysis of the transactions and an anomaly detection of the transactions. The method may also provide displaying the analytic figures as one or more of a pie graph, a line graph, and a map graph. The method may further provide requesting from a plurality of blockchain data owners access to their blockchain data to provide shared blockchain patterns via a software analytics module.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
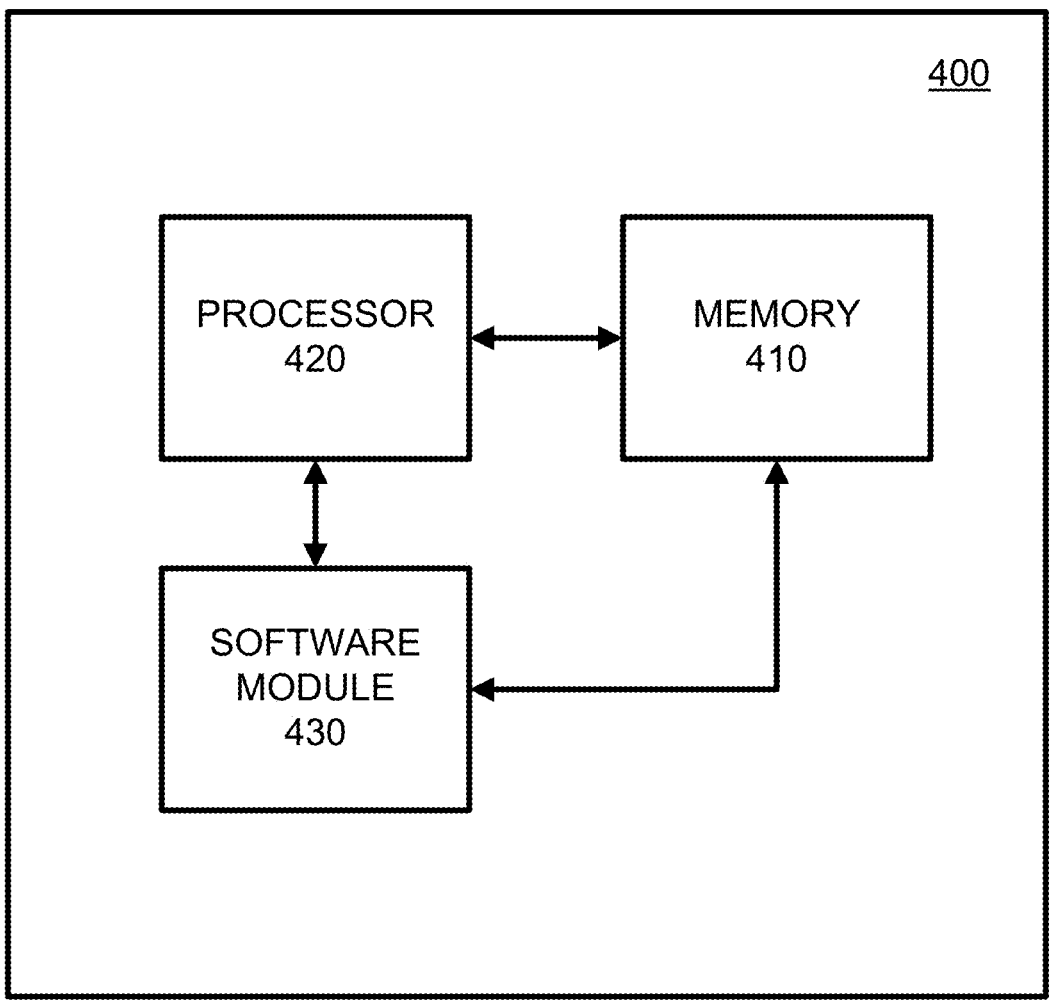
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   retrieving, by a computer device, data parameters from a blockchain based on analytic requirements identified in a smart contract associated with the blockchain;
   identifying, by the computer device, one or more permissions of a user account associated with a user; and
   generating, by the computer device, analytic data based on data obtained by the smart contract from the blockchain using the data parameters and the identified one or more permissions.

2. The method of claim 1, wherein the data parameters comprise restricted access privileges that are provided to blockchain consortium members to access the data parameters.

3. The method of claim 2, wherein the restricted access privileges limit portions of the data parameters which may be retrieved and included in the analytic figures.

4. The method of claim 1, comprising,
   populating an interface based on the data parameters retrieved from the blockchain.

5. The method of claim 1, wherein the analytic requirements are based on one or more of:
   a type of transaction in the blockchain, a party to a transaction in the blockchain, and a security function used by the blockchain.

6. The method of claim 1, further comprising:
   accessing an existing blockchain analytic library; and
   determining one or more of:
      a number of transactions, a sum of asset values, a time series analysis of the transactions, and an anomaly detection of the transactions.

7. The method of claim 3, further comprising:
   displaying the analytic figures as one or more of:
      a pie graph, a line graph, and a map graph.

8. The method of claim 3, further comprising:
   requesting from a plurality of blockchain data owners access to their blockchain data to provide shared blockchain patterns via a software analytics module.

9. An apparatus, comprising:
   a hardware-implemented processor configured to:

retrieve data parameters from a blockchain based on analytic requirements identified in a smart contract associated with the blockchain;

identify one or more permissions of a user account associated with a user; and generate analytic data based on data obtained by the smart contract from the blockchain using the data parameters and the identified one or more permissions.

10. The apparatus of claim 9, wherein the data parameters comprise restricted access privileges that are provided to blockchain consortium members to access the data parameters.

11. The apparatus of claim 10, wherein the restricted access privileges limit portions of the data parameters which may be retrieved and included in the analytic figures.

12. The apparatus of claim 9, wherein the hardware-implemented processor is configured to populate an interface based on the data parameters retrieved from the blockchain.

13. The apparatus of claim 9, wherein the analytic requirements are based on one or more of:

a type of transaction in the blockchain, a party to a transaction in the blockchain, and a security function used by the blockchain.

14. The apparatus of claim 9, wherein the hardware-implemented processor is further configured to:

access an existing blockchain analytic library, and determine one or more of:

a number of transactions, a sum of asset values, a time series analysis of the transactions, and an anomaly detection of the transactions.

15. The apparatus of claim 11, wherein the hardware-implemented processor is further configured to:

display the analytic figures as one or more of:

a pie graph, a line graph, and a map graph.

16. The apparatus of claim 12, wherein the hardware-implemented processor is further configured to:

request from a plurality of blockchain data owner's access to their blockchain data to provide shared blockchain patterns via a software analytics module.

17. A non-transitory computer readable storage medium configured to store one more instructions that when executed by a processor cause the processor to perform:

retrieving, by a computer device, data parameters to from a blockchain based on analytic requirements identified in a smart contract associated with the blockchain;

identifying, by the computer device, one or more permissions of a user account associated with a user; and generating, by the computer device, analytic data based on data obtained by the smart contract from the blockchain using the data parameters and the identified one or more permissions.

18. The non-transitory computer readable storage medium of claim 17, wherein the data parameters comprise restricted access privileges that are provided to blockchain consortium members to access the data parameters.

19. The non-transitory computer readable storage medium of claim 18, wherein the restricted access privileges limit portions of the data parameters which may be retrieved and included in the analytic figures.

20. The non-transitory computer readable storage medium of claim 17, wherein the one more instructions further cause the processor to perform:

populating an interface based on the data parameters retrieved from the blockchain.

\* \* \* \* \*